(12) United States Patent
Zupancic et al.

(10) Patent No.: US 6,255,398 B1
(45) Date of Patent: Jul. 3, 2001

(54) HIGH VOLUME SOLIDS FLUOROCARBON COATINGS

(75) Inventors: Joseph J. Zupancic, Glen Ellyn, IL (US); Jack C. Allman, Twin Lakes, WI (US); James V. Lang, Harvard, IL (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/343,004

(22) Filed: Jun. 29, 1999

(51) Int. Cl.$^7$ .............................. C08L 33/04; C08L 35/02; C08L 33/06
(52) U.S. Cl. ..................... 525/199; 525/222; 525/227; 525/230; 525/418; 525/424; 525/426; 525/427
(58) Field of Search .................................... 525/199, 222, 525/227, 230, 418, 424, 426, 427

(56) References Cited

U.S. PATENT DOCUMENTS

| | | | |
|---|---|---|---|
| 3,037,006 | 5/1962 | Hankins et al. | 260/80.5 |
| 3,779,976 | 12/1973 | De Marsico et al. | 260/32.8 |
| 4,314,004 | 2/1982 | Stoneberg | 428/421 |
| 4,659,768 | 4/1987 | Tortorello et al. | 524/512 |
| 4,824,728 | 4/1989 | Parsons et al. | 428/421 |
| 5,185,403 | 2/1993 | Lewarchik et al. | 525/199 |
| 5,281,444 | 1/1994 | Hunt | 427/428 |

FOREIGN PATENT DOCUMENTS

| | | |
|---|---|---|
| 0 422 684 A1 | 10/1990 | (EP) . |
| WO93/13178 | 7/1993 | (EP) . |
| 1 361 493 | 6/1971 | (GB) . |

OTHER PUBLICATIONS

Copy of International Search Report PCT/US00/16124.

Primary Examiner—Nathan M. Nutter

(57) ABSTRACT

The invention provides thermosetting coating compositions in which acrylic copolymers are used as carriers for fluorocarbon resins. The compositions have a combination of high fluorocarbon content, high solids content, and a low viscosity suitable for coil coating. Thus, the solids are borne in organic solvent systems which permit minimization of the viscosity and a moderate evaporation rate. The solvent system has a $\delta_H$ of from 1.7 to 2.6 (calories/cubic centimeter)$^{1/2}$ and a $\delta_V$ of from 8 to 9.5 (calories/cubic centimeter)$^{1/2}$ and is exemplified by a mixture of 4 or more of the following solvents: aliphatic ketones having from 4 to 10 carbon atoms, alkyl esters having a total of from 5 to 7 carbon atoms, aromatic acid esters having from 8 to 12 carbon atoms, lactones, and aromatic solvents. The acrylic polymer is comprised of (a) acrylic esters having no additional functionality, (b) acrylic esters having additional functionality by which the acrylic polymer may be cross-linked, and (c) an acryloxyalkyl oxazolidine.

29 Claims, No Drawings

HIGH VOLUME SOLIDS FLUOROCARBON COATINGS

The present invention is directed to thermosetting compositions in which acrylic copolymers are used as carriers for fluorocarbon resins. More particularly, it is directed to such compositions having a high solids content much desired but not achieved until now. The coatings are particularly useful in coil coating processes.

BACKGROUND OF THE INVENTION

Fluorocarbon resins, such as polyvinylidene fluoride (PVDF), are useful in formulating coatings with excellent weathering resistance. Because fluorocarbons have poor rheology and pigment wetting characteristics, it is common to add a modifying polymer to fluorocarbon coating compositions. A typical binder polymer is an acrylic polymer, and both thermosetting and thermoplastic acrylics resins have been utilized for this purpose.

Coatings containing fluorocarbons and thermosetting resins, wherein the acrylic polymers have functionality that renders them cross-linkable, and in which a cross-linker is included in the resin composition, are sold by several coating producers. U.S. Pat. No. 3,779,976 describes combinations of polyvinyl fluoride and a thermoplastic copolymer of methyl methacrylate and 3-(2-methacryloxyethyl)-2,2-spirocyclohexyl oxazolidine. Thermosetting binder polymers are preferred for many applications because of the improved mechanical and chemical resistance they provide.

As noted in U.S. Pat. No. 5,185,403, a high fluorocarbon resin content is required to achieve optimal weathering and chemical resistance. Many coating applications call for coating compositions in which the fluorocarbon resin comprises 70 wt. % or more of the resin and the binder polymer the remainder. Coating compositions containing fluorocarbon resins, particularly PVDF, and thermosetting acrylic resins tend, however, to have relatively high viscosities at the solids levels used. For some coating applications, particularly coil coating, it is desirable to have high fluorocarbon resin content, a high total solids content and a lower viscosity than is currently available.

In a coil coating operation, a coil of sheet metal is uncoiled as it is pulled through a series of rollers, one or more of which is a paint applicator roller, at up to 1000 feet per minute. The paint is picked up by a roller rotating in a paint pan and transferred to an applicator roller, thence to the moving sheet metal. It is then passed through a curing oven and coiled again for the market. The cost of coating could be lessened greatly if the solids content of the paint were high enough that a sufficiently thick layer could be applied in one pass through the coating process. But a high solids content usually means that the paint's viscosity would be too great for efficient transfer from roller to roller.

SUMMARY OF THE INVENTION

It is an object of this invention, therefore, to provide a fluorocarbon/acrylic resin coating composition having a combination of high fluorocarbon content, high solids content, and a low viscosity suitable for coil coating.

This and other objects which will be apparent from the following description of the invention are achieved by a coating composition having a volume solids content of from about 45 to about 55 percent and comprising a fluorocarbon resin, a cross-linkable acrylic binder copolymer having a weight average molecular weight (Mw) of from about 8,000 to about 18000, a cross-linking agent for the acrylic binder copolymer, and a solvent system consisting essentially of mixtures of 4 or more of the following solvents: aliphatic ketones having from 4 to 10 carbon atoms, alkyl esters having a total of from 5 to 7 carbon atoms, aromatic acid esters having from 8 to 12 carbon atoms, lactones, and aromatic solvents.

The binder copolymer is formed from acrylic monomers that include:

(a) acrylic esters having no additional functionality, (b) acrylic esters such as 2-hydroxyethyl methacrylate, 2-hydroxypropyl methacrylate, 2-hydroxyethyl acrylate, and acetoacetoxyethyl methacrylate having functionality for reaction with cross-linking agents, such as aminoplasts, phenoplasts, isocyanates; and (c) acryloxyalkyl-oxazolidines which function to lower and stabilize the viscosity of the fluorocarbon resin-based coating composition.

DETAILED DESCRIPTION OF CERTAIN PREFERRED EMBODIMENTS

Herein, unless stated otherwise, components of the coating composition will be stated in parts per hundred resin (phr) based upon the total weight of polymer (i.e., the fluorocarbon resin and the acrylic polymer); monomer components of polymers are expressed as mole percentages; and other percentages expressed are by weight.

Suitable fluorocarbon resins for use in the invention include polyvinylidene fluoride, such as those sold under the tradename Kynar; polyvinyl fluoride, polytetrafluoroethylene; copolymers of vinylidene fluoride and tetrafluoroethylene, such as that sold under the trademark Kynar SL; a fluoroethylene/vinyl ester/vinyl ether sold under the trademark Fluonate; proprietary vinylidene fluoride-based polymers sold under the trademarks Kynar 500 and Kynar SL; and mixtures of fluorocarbon resins. The fluorocarbons are high molecular wt., typically having molecular weights (weight average) above 250,000. The fluorocarbon resins are utilized in powder form. The powders are insoluble in the solvents used in the coating compositions of the present invention, but are swelled by the solvents. The fluorocarbon resin comprises between about 40 and 90 phr of the polymer, typically between about 70 and about 80 phr; 70 phr being considered to be near optimal for chemical and mechanical resistance. Above 70 phr, minor improvements in chemical and mechanical resistance may be achieved, but with increasing costs due to the high cost of the fluorocarbon resins.

In accordance with the present invention, a unique acrylic binder polymer is provided which is formed from three types of acrylate monomers. The first type of acrylate monomer (a) is an acrylic ester having no additional functionality. This monomer has the general formula:

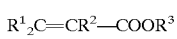
$$R^1{}_2C\!=\!CR^2\!-\!COOR^3$$

wherein $R^1$ and $R_2$ are the same or different and are each selected from —H and $C_1$–$C_3$ alkyl and $R^3$ is $C_1$–$C_6$ alkyl. Examples of this type (a) of acrylate monomer include methyl methacrylate, ethyl methacrylate, ethyl acrylate, methyl acrylate, butyl acrylate and butyl methacrylate.

The second type of acrylate monomer (b) is an acrylic acid ester having the general formula:

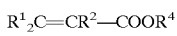
$$R^1{}_2C\!=\!CR^2\!-\!COOR^4$$

wherein $R^1$ and $R^2$ are the same or different and are selected from H, and $C_1$–$C_3$ alkyl, and $R^4$ is the residue of an alcohol having additional OH or beta-diketone functionality. More specifically, $R^4$ is preferably the residue of a $C_2$ or $C_3$ glycol or has the formula:

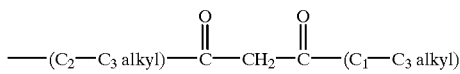

Examples of this type (b) of acrylate monomer include 2-hydroxyethyl methacrylate, 2-hydroxyethyl acrylate, 2-hydroxypropyl acrylate,2-hydroxypropyl methacrylate and acetoacetoxyethyl methacrylate.

The third type (c) of acrylic monomer is an acryloxy-alkyl oxazolidine, as described in U.S. Pat. No. 3,037,006, the teachings of which are incorporated herein by reference. Specifically, acryloxyalkyl-oxazolidines useful in the invention have the formula:

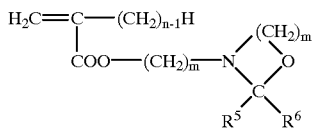

wherein n is an integer having a value of 1 to 2, m is an integer having a value of 2 to 3; $R^5$ and $R^6$ are optionally directly joined together to form a 5- to 6-carbon ring with the attached carbon atom of the ring in the formula; $R^5$, when not directly joined to $R^6$, is selected from the group consisting of hydrogen, phenyl, benzyl, and $(C_1-C_{1\ 2})$ alkyl groups; $R^6$, when not directly joined to $R^5$, is selected from the group consisting of hydrogen and $(C_1-C_4)$ alkyl groups. When joined together, $R^5$ and $R^6$ are selected from the group consisting of pentamethylene and tetramethylene. Representative of this type (c) of monomer is 3-(2-methacryloxyethyl)-2,2-spirocyclohexyl oxazolidine (MESO).

The first type (a) monomer provides flexibility to the polymer and is used at between about 85 and about 97.5 mole percent. This first type (a) monomer is necessary to provide the cured coating with weather resistance and toughness. The second type (b) monomer enables the acrylate polymer to be cross-linked and is used at between about 2 and about 10 mole percent. The third type (c) monomer is used in the acrylate polymer at between about 0.5 and about 5 mole percent to reduce the viscosity of a fluorocarbon resin/thermosetting acrylic polymer coating composition. It is also believed that this type (c) of acrylic monomer helps to stabilize the acrylic polymer with the fluorocarbon resin and thereby stabilizes the viscosity of the fluorocarbon resin/acrylic resin coating composition.

The acrylic binder, used at a level of between about 10 and about 60 phr, assists in film formation and disperses pigments and fillers. The weight average molecular weight (Mw) of the acrylic resin is between about 8,000 and about 18,000, preferably in the range of from 11,000 to about 16,000, and more preferably, from about 11,000 to about 13,000. The number average molecular weight (Mn) ranges from about 2000–7000, preferably from about 4000 to about 6000, and more preferably from about 4000 to about 5000, giving a moderate polydispersity of about 2.10 to about 3.60.

The cross-linking agent for the acrylic polymer may be an aminoplast resin, such as a melamine/formaldehyde resin or a melamine urea resin. Other suitable cross-linking agents include isocyanates, blocked isocyanates, organosilanes, and glycol ureas. The cross-linking agent is generally selected to be substantially non-reactive with the acrylic polymer at ambient temperatures, but to cross-link the same at an elevated curing temperature, e.g., the temperature of the substrate to which the coating composition is applied. The cross-linking agent is typically employed at between about 1.5 and about 10.0 phr relative to the total amount of the fluorocarbon resin and acrylic polymer.

The weight percent of solids in the compositions of this invention is from about 60 to about 75 weight percent. It is believed that such a high concentration of solids is made possible by the moderate molecular weight of the acrylic binder resin and the particular solvent system chosen for this invention. Thus, the solids are borne in organic solvent systems which permit minimization of the viscosity and a moderate evaporation rate. The preferred solvents include methyl amyl ketone, methyl iso-amyl ketone, methyl propyl ketone, diisobutyl ketone, isophorone, n-butyl acetate, sec-butyl acetate, n-amyl acetate, sec-amyl acetate, n-propyl acetate, iso-propyl acetate, n-butyl propionate, n-amyl propionate, sec-amyl propionate, n-propyl propionate, iso-propyl propionate, propylene carbonate, dibasic esters, dimethyl glutarate, dimethyl adipate, dimethyl succinate, diethylene glycol butyl ether acetate, dimethyl phthalate, butyrolactone, toluene, xylenes, Aromatic 100, and Aromatic 150. Aromatic 100 is an aromatic solvent blend of 59.0 to 63% naptha solvents, 20.0% 1,2,4-trimethylbenzene, 7 to 11% 1,3,5-trimethylbenzene, 7% xylene and 3.0% isopropylbenzene, and Aromatic 150 is an aromatic solvent blend comprising from 84 to 90% by weight aromatic petroleum distillates, 10.0% napthalene and 0 to 4.0% by weight trimethylbenzene, where all weight are based on 100% total solvent composition. Glycol ethers, alcohols and other solvents having a hydroxyl function should be avoided. The solvent system for the fluorocarbon coating composition of this invention can be defined in terms of the Hildebrand expression for the square root of the cohesive energy density which is defined as the solubility parameter ($\delta$) of a solvent. The solvent parameters $\delta_H$ and $\delta_V$ are used for selecting the mixed solvent system for this invention; $\delta_H$ is the hydrogen bonding component and $\delta_V=(\delta_P^2+\delta_D^2)^{1/2}$ where $\delta_P$ is the polar component and $\delta_D$ is the dispersion component for the mixed solvent system. The solvent system for this invention has a $\delta_H$ of from 1.7 to 2.6 (calories/cubic centimeter)$^{1/2}$ and a $\delta_V$ of from 8 to 9.5 (calories/cubic centimeter)$^{1/2}$. Not all solvent systems within this range perform equally well. Suitable solvent systems for this invention include the mixtures of solvents shown by weight percent in the following table:

| | | SOLVENT | | | |
| Butyl acetate | MAK | Isophorone | Xylenes | Ar-100 | Ar-150 |
| --- | --- | --- | --- | --- | --- |
| 3–15 | 3–15 | 0–22 | 0–5 | — | — |
| 3–15 | 3–15 | 0–22 | 0–5 | 0–10 | 0–10 |
| 3–15 | 3–15 | 0–22 | 0–5 | — | 0–10 |
| 3–6 | 3–6 | 0–22 | 0.5–1.5 | — | — |
| 4 | 4 | 12–22 | 1 | — | — |
| 8 | 8 | 10–16 | 1 | — | 6 |
| 8 | 8 | 8–16 | 1 | 3 | 5 |
| 10 | 10 | 15–22 | 2 | — | — |
| 10 | 10 | 10–22 | 1 | — | 5 |

Propylene carbonate may be fully or partially substituted for the butyl acetate in the above mixtures to make suitable solvent systems for this invention. It is especially preferred that equal amounts of the butyl acetate and methyl amyl ketone are used.

The solvent system for the acrylic resin, on the other hand, may be outside of the range for the coating composition. The solvent system used for the polymerization of the acrylic monomers is a sub-system of the whole, containing 2 or 3 of the aliphatic solvents mentioned above; it is usually non-aromatic. A preferred solvent system for the polymerization comprises a mixture of a ketone and an alkyl acetate and/or propylene carbonate.

A free radical initiator such as azobis (methylbutyronitrile), azobisisobutyronitrile, or azobis(2,4-dimethylvaleronitrile) (e.g., that sold under the VAZO trademark) or a mixture thereof is used to catalyze the copolymerization of the three acrylic monomers to form the acrylic binder resin. A mercaptan such as mercaptoethanol may be used as a chain stopper.

The coating composition of this invention may also contain pigments and fillers up to about 18 phr. The coating composition may be clear when used, for example, as a clear coat over a color coat. Both underlying color coat and overlaying clear coat may be formulated in accordance with the invention. The coating may be applied to a bare metal surface, but is preferably applied to metal which has been first coated with a primer coat. Suitable primers include acrylics, polyesters, and epoxies crosslinked with melamines, blocked isocyanates and phenolics.

The coating compositions in accordance with the present invention may be applied to substrates by a variety of processes. However, the coating compositions are particularly formulated for and useful in reverse coil coating processes such as described hereinabove. The stability of a coating composition of this invention is such that the #4 Zahn viscosity does not rise above 40 secs (a 45% increase) after 7 days of storage at room temperature. In coil coating, the coating compositions are typically applied at peak metal temperatures (PMT) of about 465–480° F. (241–249° C.). Dwell time at PMT ranges from about 20 to about 60 sec. If the coatings are applied by spray, cure temperatures are similar, but substantially longer cure times are required due to larger metal mass, e.g., about 20 minutes. The 60° gloss of coatings laid down from the compositions of this invention is at least 30 without flattening agents.

The invention will now be described in greater detail by specific examples. The ingredients are listed multiple times if added in separate charges.

EXAMPLE 1

A polymer is prepared using the following ingredients:

| INGREDIENTS | GRAMS |
| --- | --- |
| 1. n-Butyl acetate | 267.70 |
| 2. Methyl amyl ketone MAK | 242.70 |
| 3. Methyl methacrylate MMA | 742.40 |
| 4. 3-(2-methacryloxyethyl)-2,2-spirocyclohexyl oxazolidine (MESO)* | 198.80 |
| 5. Hydroxyethyl methacrylate (HEMA) | 39.20 |
| 6. VAZO 67 (initiator) | 9.80 |
| 7. MAK | 44.00 |
| 8. 2-Mercaptoethanol (ME) | 10.00 |
| 9. MAK | 25.00 |
| 10. VAZO 67 | 9.80 |
| 11. MAK | 53.80 |
| 12. ME | 10.00 |
| 13. n-Butyl acetate | 97.80 |

*15% solution in methyl methacrylate

The n-Butyl acetate (1) and MAK (2) were charged to a four liter resin reaction flask equipped with a mechanical stirrer, condenser, thermocouple, inert gas inlet, and addition funnel. The reactor was flushed with nitrogen and the charge was heated to 103–107° C. A premix of ingredients 3–9 was placed in the addition funnel and then added to the reactor over a three hour period maintaining the temperature at 103–107° C. After the addition was complete, the reactor contents were held at 103–107° C. for thirty minutes. One quarter increments of a solution of VAZO 67 in MAK (ingredients 10, 11, and 12) were added every thirty minutes. After a final post-cook of thirty minutes, the resin solids were adjusted with ingredient 13. The resulting polymer solution possessed the following properties: ASTM Solids: 62.9 (wt %); Volume Solids=55.9%; Gardner-Holdt Viscosity=Z6+; AV/NV=3.67; Amine Value/NV=6.91; WPG=8.39; VOC=3.11; GPC: Mn=3610; Mw=8630; Mz=15200; Dispersity=2.39

EXAMPLE 2

The general procedure of Example 1 was repeated with following ingredients:

| INGREDIENTS | GRAMS |
| --- | --- |
| 1. n-Butyl acetate | 485.75 |
| 2. (MAK) | 364.05 |
| 3. (MMA) | 1188.15 |
| 4. (MESO)* | 223.65 |
| 5. (HEMA) | 58.80 |
| 6. VAZO 67 | 14.70 |
| 7. MAK | 66.00 |
| 8. 2-mercaptoethanol (ME) | 15.00 |
| 9. MAK | 37.50 |
| 10. VAZO 67 (initiator) | 14.70 |
| 11. MAK | 80.70 |
| 12. n-Butyl acetate | 62.50 |

The resulting polymer solution possessed the following properties: ASTM Solids : 63.3%; Volume Solids=55.9%; Gardner-Holdt Viscosity=Z7–; AV/NV=0.84; Amine Value/NV=5.34; WPG=8.48; VOC=3.11; GPC: Mn=4460; Mw=11180; Mz=19440; Dispersity=2.51

EXAMPLE 3

The general procedure of Example 1 was repeated using the following ingredients except that the temperature was 110–114° C. and the initiator solution as added in one-third increments

| INGREDIENTS | GRAMS |
| --- | --- |
| 1. Propylene carbonate | 338.55 |
| 2. (MAK) | 177.30 |
| 3. (MMA) | 742.40 |
| 4. (MESO)* | 198.80 |
| 5. (HEMA) | 39.20 |
| 6. VAZO 67 | 29.40 |
| 7. MAK | 146.25 |
| 8. VAZO 67 | 9.80 |
| 9 MAK | 53.80 |
| 10. Propylene carbonate | 38.80 |

The resulting polymer solution possessed the following properties: ASTM Solids 53.5%; Volume Solids=48.7%; Gardner-Holdt Viscosity =Z3+; AV/NV=0.69; Amine Value/NV=6.56; WPG=8.95; VOC=4.16; GPC: Mn=4590; Mw=12090; Mz=21200; Dispersity=2.63

EXAMPLE 4

The general procedure of Example 3 was repeated using the following ingredients:

| INGREDIENTS | GRAMS |
|---|---|
| 1. n-Butyl acetate | 893.05 |
| 2. MAK | 573.75 |
| 3. MMA | 1469.95 |
| 4. MESO | 393.62 |
| 5. HEMA | 77.62 |
| 6. VAZO 67 | 48.53 |
| 7. MAK | 289.60 |
| 8. VAZO 67 | 19.40 |
| 9. MAK | 166.45 |
| 10. n-Butyl acetate | 136.75 |

The resulting polymer solution possessed the following properties: ASTM Solids: 53.8%, Volume Solids=45.8%; Gardner-Holdt Viscosity Z–; AV/NV=1.09; Amine Value/NV=6.73, WPG=8.28; VOC=3.83 GPC: Mn=4780; Mw=12700; Mz=22560; Dispersity=2.66

EXAMPLE 5

The following components were used in the preparation of fluorocarbon-based coating compositions of this invention.

| COMPONENTS | GRAMS |
|---|---|
| 1. Acrylic resin of Example 1 | 11.04 |
| 2. Xylene | 0.78 |
| 3. Micronized synthetic wax | 0.50 |
| 4. Titanium dioxide (TiO$_2$) (R960) | 17.74 |
| 5. Antimony oxide | 1.77 |
| 6. Dimethyl phthalate | 2.00 |
| 7. Acrylic resin of Example 1 | 3.94 |
| 8. Isophorone | 9.00 |
| 9. Organotin stabilizer (THERMOLITE 31) | 0.13 |
| 10. p-Toluene sulfonic acid (25% solution) | 0.20 |
| 11. Polyvinylidene fluoride (PVDF) | 22.00 |
| 12. Aromatic 150 solvent | 3.00 |
| 13. Hexamethoxymethyl melamine (RESIMENE 747) | 0.50 |
| 14. Dimethyl phthalate | 3.00 |
| 15. CYASTAT SN (antistatic agent) | 0.10 |

A white pigment dispersion was prepared by sand milling components 1 through 6 to a Hegman reading of 7+. A fluorocarbon dispersion was made by milling components 7 through 12 to a Hegman reading of 5.5. The coating composition of this invention was prepared by mixing the pigment dispersion and the fluorocarbon dispersion followed by the melamine letdown (components 13–15).

The coating composition had the following properties: Weight Solids: 68.94%; Volume Solids: 52.15%; WPG: 12.09; VOC: 3.75; Initial Viscosity (#4Zahn): 26 secs; after 24 hrs: 35 secs; after 7 days: 35 secs.

The coating composition was applied to steel panels and baked for 45 seconds at 550° F. (288° C.) to yield a film thickness of 0.80 mil. The 60° gloss was 30.

EXAMPLE 6

The general procedure of Example 5 was repeated with the following components:

| COMPONENTS | GRAMS |
|---|---|
| 1. Acrylic resin of Example 2 | 54.12 |
| 2. Isophorone | 15.00 |
| 3. Xylene | 5.00 |
| 4. Micronized synthetic wax | 2.51 |
| 5. Titanium dioxide (TiO$_2$) (R960) | 88.72 |
| 6. Antimony oxide | 8.85 |
| 7. Acrylic resin of Example 2 | 20.41 |
| 8. Isophorone | 65.02 |
| 9. Organotin stabilizer (THERMOLITE 31) | 0.65 |
| 10. p-Toluene sulfonic acid (25% solution) | 0.49 |
| 11. Polyvinylidene fluoride (PVDF) | 110.03 |
| 12. Hexamethoxymethyl melamine (RESIMENE 747) | 2.80 |
| 13. Isophorone | 5.00 |

The coating composition had the following properties: Weight Solids: 68.90%; Volume Solids: 50.86%; WPG: 11.84; VOC: 3.68; Initial Viscosity (#4Zahn): 29 secs; after 24 hrs: 33 secs; after 7 days: 34 secs.

The coating composition was applied to steel panels and baked for 45 seconds at 550° F. (288° C.) to yield a film thickness of 0.80 mil. The 60° gloss was 30.

EXAMPLE 7

The general procedure of Example 5 was repeated with the following components:

| COMPONENTS | GRAMS |
|---|---|
| 1. Acrylic resin of Example 4 | 63.92 |
| 2. Isophorone | 10.01 |
| 3. Xylene | 5.00 |
| 4. Micronized synthetic wax | 2.51 |
| 5. Titanium dioxide (TiO$_2$) (R960) | 88.73 |
| 6. Antimony oxide | 8.86 |
| 7. Acrylic resin of Example 4 | 24.05 |
| 8. Isophorone | 60.00 |
| 9. Organotin stabilizer (THERMOLITE 31) | 0.64 |
| 10. p-Toluene sulfonic acid (25% solution) | 0.51 |
| 11. Polyvinylidene fluoride (PVDF) | 110.00 |
| 12. Hexamethoxymethyl melamine (RBSIMENE 747) | 2.80 |
| 13. Isophorone | 10.00 |

The coating composition had the following properties: Weight Solids: 67.39%; Volume Solids: 48.89%; WPG: 11.70; VOC: 3.81; Initial viscosity (#4Zahn): 21 secs; after 24 hrs: 27 secs after 21 days: 35 secs.

The coating composition was applied to steel panels and baked for 45 seconds at 550° F. (288° C.) to yield a film thickness of 0.80 mil. The 60° gloss was 31; MEK rubs: 100; Pencil hardness: F; T-bend: 0T with no pick off and 1T with no crack.

Comparative Example 1

An acrylic resin was made from the following ingredients:

| INGREDIENTS | GRAMS |
|---|---|
| 1. Propylene carbonate | 5468.50 |
| 2. (MAK) | 5087.20 |
| 3. (MMA) | 5790.60 |

-continued

| INGREDIENTS | GRAMS |
|---|---|
| 4. (MESO)* | 1550.70 |
| 5. (HEMA) | 305.60 |
| 6. VAZO 67 | 76.50 |
| 7. MAK | 343.20 |
| 8. VAZO 67 | 76.50 |
| 9. MAK | 419.70 |
| 10. Propylene carbonate | 381.50 | by charging Items 1 and 2 to a 22 liter reactor equipped with a mechanical stirrer, condenser, thermocouple, inert gas inlet, and addition funnel, flushing the reactor with nitrogen and heating it to 103–107° C. before a premix of items 3–7 was added from the funnel over a three hour period; the temperature range was maintained for 30 minutes after the addition. A solution of items 8 and 9 was added in one-third increments at 30 minute intervals. The resin was then post-cooked for 30 minutes and the solids were adjusted with item 10.

The resulting polymer solution possessed the following properties: ASTM Solids: 43.4%; Volume Solids=38.2%; Gardner-Holdt Viscosity=Z3–; AV/NV=1.40; Amine Value/NV=6.00; WPG=8.85; VOC=5.01; GPC: Mn=6090; Mw=26110; Mz=53040; Dispersity=4.29

The following components were used in the preparation of a fluorocarbon-based coating composition for comparison with those of this invention.

| COMPONENTS | GRAMS |
|---|---|
| 1. Acrylic resin prepared as above | 58.70 |
| 2. Isophorone | 48.70 |
| 3. Xylene | 8.20 |
| 4. Micronized synthetic wax | 3.00 |
| 5. Titanium dioxide ($TiO_2$) (R960) | 177.10 |
| 6. Antimony oxide | 19.60 |
| 7. Acrylic resin as in Item 1 | 159.50 |
| 8. Isophorone | 200.00 |
| 9. Organotin stabilizer (THERMOLITE 31) | 1.40 |
| 10. p-Toluene sulfonic acid (25% solution) | 1.00 |
| 11. Polyvinylidene fluoride (PVDF) | 241.70 |
| 12. RESIMENE 747 | 5.60 |
| 13. Acrylic resin as in Item 1 | 40.90 |

A white pigment dispersion was prepared by sand milling components 1 through 6 to a Hegman reading of 7+. A fluorocarbon dispersion was made by milling components 7 through 11 to a Hegman reading of 5.5. The coating composition was prepared by mixing the pigment dispersion and the fluorocarbon dispersion followed by the melamine letdown (components 12–13).

The comparative coating composition had the following properties: Weight Solids: 58.01%; Volume Solids: 40.42%; WPG: 11.10; VOC: 4.66; Initial Viscosity (#4Zahn): 21 secs; after 24 hrs: 21 secs; after 7 days: 22 secs. It is evident that the solids content is significantly lower than the coating compositions of this invention.

The comparative coating composition was applied to steel panels and baked for 45 seconds at 550° F. to obtain a film thickness of 0.80 mil. The coating had a 60° Gloss of 30; MEK rubs: 100; Pencil hardness: F; a T-Bend of 0T with no pick off and 1T with no crack.

While the invention has been described in terms of certain preferred embodiments, modifications obvious to one with ordinary skill in the art may be made without departing from the scope of the invention. Various features of the invention are set forth in the following claims.

The subject matter claimed is:

1. A coating composition having a volume solids content of from about 45 to about 55 percent and comprising a fluorocarbon resin, a cross-linkable acrylic binder copolymer having a weight average molecular weight (Mw) of from about 8,000 to about 18000, a cross-linking agent for the acrylic binder copolymer, and a solvent system having a $\delta_H$ of from 1.7 to 2.6 (calories/cubic centimeter)$^{1/2}$ and a $\delta_V$ of from 8 to 9.5 (calories/cubic centimeter)$^{1/2}$.

2. The coating composition of claim 1 wherein the solvent system consists essentially of a mixture of 4 or more of the following solvents: aliphatic ketones having from 4 to 10 carbon atoms, alkyl esters having a total of from 5 to 7 carbon atoms, aromatic acid esters having from 8 to 12 carbon atoms, lactones, and aromatic solvents.

3. The coating composition of claim 1 wherein the molecular weight of the acrylic copolymer is from about 11,000 to about 16000.

4. The coating composition of claim 1 wherein the molecular weight of the acrylic copolymer is from about 11,000 to about 13000.

5. The coating composition of claim 1 wherein the solvent system is a mixture of n-butyl acetate, methyl amyl ketone, xylenes, and isophorone.

6. The coating composition of claim 5 comprising from about 3 to about 15% of the butyl acetate, from about 3 to about 15% of the methyl amyl ketone, from 0 to about 5% of the xylenes, and from 0 to about 22% of the isophorone.

7. The coating composition of claim 1, wherein the solvent system is a mixture of n-butyl acetate, methyl amyl ketone, xylenes, isophorone, a first aromatic solvent blend (A) comprising 59.0 to 63% naptha solvents, 20.0% 1,2,4-trimethylbenzene, 7 to 11% 1,3,5-trimethylbenzene, 7% xylene and 3.0% isopropylbenzene and a second aromatic solvent blend (B) comprising from 84 to 90% by weight aromatic petroleum distillates, 10.0% napthalene and 0 to 4.0% by weight trimethylbenzene, where all weights are based on 100% total solvent composition.

8. The coating composition of claim 7 comprising from about 3 to about 15% of the butyl acetate, from about 3 to about 15% of the methyl amyl ketone, from 0 to about 5% of the xylenes, from 0 to 10% of the aromatic solvent blend (A), from 0 to about 10% of the aromatic solvent blend (B) and from 0 to 22% isophorone.

9. The coating composition of claim 1 wherein the solvent system is a mixture of n-butyl acetate, methyl amyl ketone, xylenes, isophorone, and aromatic solvent blend (B).

10. The coating composition of claim 9 comprising from about 3 to about 15% of the butyl acetate, from about 3 to about 15% of the methyl amyl ketone, from about 0 to about 5% xylenes, from 0 to about 10% of the aromatic solvent blend (B), and from 0 to about 22% of the isophorone.

11. The coating composition of claim 1 wherein the solvent is a mixture of, by weight, about 8% butyl acetate, about 8% methyl amyl ketone, about 1% xylenes, about 6% aromatic solvent blend (B), and from about 10 to about 16% of isophorone.

12. The coating composition of claim 1 wherein the solvent is a mixture of, by weight, about 8% butyl acetate, about 8% methyl amyl ketone, about 1% xylenes, about 3% aromatic blend (A), about 5% aromatic solvent blend (B), and from about 8 to about 16% of isophorone.

13. The coating composition of claim 1 wherein the solvent is a mixture of, by weight, about 8% butyl acetate, about 8% methyl amyl ketone, about 1% xylenes, about 6% aromatic solvent blend (B), and from about 10 to about 16% of isophorone.

14. The coating composition of claim 1 wherein the solvent is a mixture of, by weight, about 10% butyl acetate, about 10% methyl amyl ketone, about 2% xylenes, and from about 15 to about 22% of isophorone.

15. The coating composition of claim 1 wherein the solvent is a mixture of, by weight, about 10% butyl acetate, about 10% methyl amyl ketone, about 1% xylenes, about 5% aromatic solvent blend (B), and from about 10 to about 22% of isophorone.

16. The coating composition of claim 1 wherein the solvent system is a mixture of methyl amyl ketone, propylene carbonate, xylene, and isophorone.

17. The coating composition of claim 1 wherein the solvent system is a mixture of methyl amyl ketone, propylene carbonate, isophorone, xylenes, and aromtic solvent blends (A) and (B).

18. The coating composition of claim 1 wherein the solvent system is a mixture of methyl amyl ketone, propylene carbonate, isophorone, xylenes, and aromatic solvent blend (B).

19. The coating composition of claim 1 comprising between about 40 and about 90 phr of the fluorocarbon resin, between about 10 and about 60 phr of the acrylic binder copolymer and between about 1.5 and about 10.0 phr of the cross-linking agent, said acrylic binder polymer being formed from a mixture of acrylic monomers comprising:

(a) between about 85 and about 97.5 mole percent of a monomer having the formula:

$$R^1{}_2C=CR^2-COOR^3$$

wherein $R^1$ and $R_2$ are the same or different and are each selected from H, and $C_1$–$C_3$ alkyl and $R^3$ is $C_1$–$C_6$ alkyl, (b) between about 2 and about 10 mole percent of a monomer having the formula:

$$R^1{}_2C=CR^2-COOR^4$$

wherein $R^1$ and $R_2$ are the same or different and are selected from H, $C_1$–$C_3$ alkyl, and $R^4$ is the residue of an alcohol having additional OH or beta-diketone functionality, and, (c) between about 0.5 and about 5 mole percent of an acryloxyalkyl-oxazolidine.

20. A coating composition having a volume solids content of from about 45 to about 55 percent and comprising a fluorocarbon resin, a cross-linkable acrylic binder copolymer having a weight average molecular weight (Mw) of from about 8,000 to about 18000, a cross-linking agent for the acrylic binder copolymer, and a solvent system consisting essentially of a mixture of 4 or more of the following solvents: aliphatic ketones having from 4 to 10 carbon atoms, alkyl esters having a total of from 5 to 7 carbon atoms, aromatic acid esters having from 8 to 12 carbon atoms, lactones, and aromatic solvents.

21. The coating composition of claim 20 wherein the molecular weight of the acrylic copolymer is from about 11,000 to about 16000.

22. The coating composition of claim 20 wherein the molecular weight of the acrylic copolymer is from about 11,000 to about 13000.

23. The coating composition of claim 20 wherein the solvent system is a mixture of n-butyl acetate, methyl amyl ketone, xylenes, and isophorone.

24. The coating composition of claim 23 comprising from about 3 to about 6% of the butyl acetate, from about 3 to about 6% of the methyl amyl ketone, from about 0.5 to about 1.5% of the xylenes, and from 0 to about 22% of the isophorone.

25. The coating composition of claim 23 wherein the percentages of the butyl acetate and the methyl amyl ketone are about equal.

26. The coating composition of claim 23 wherein the percentages of the solvents are: about 4% butyl acetate; about 4% methyl amyl ketone; about 1% xylenes, and from about 12 to about 22% isophorone.

27. The coating composition of claim 20 comprising between about 40 and about 90 phr of the fluorocarbon resin, between about 10 and about 60 phr of the acrylic binder copolymer and between about 1.5 and about 10.0 phr of the cross-linking agent, said acrylic binder polymer being formed from a mixture of acrylic monomers comprising:

(a) between about 85 and about 97.5 mole percent of a monomer having the formula:

$$R^1{}_2C=CR^2-COOR^3$$

wherein $R^1$ and $R_2$ are the same or different and are each selected from H and $C_1$–$C_3$ alkyl and $R^3$ is $C_1$–$C_6$ alkyl, (b) between about 2 and about 10 mole percent of a monomer having the formula:

$$R^1{}_2C=CR^2-COOR^4$$

wherein $R^1$ and $R_2$ are the same or different and are selected from H, $C_1$–$C_3$ alkyl, and $R^4$ is the residue of an alcohol having additional OH or beta-diketone functionality, and, (c) between about 0.5 and about 5 mole percent of an acryloxyalkyl-oxazolidine.

28. The coating composition of claim 27 wherein said monomers comprise methyl methacrylate, 2-hydroxyethylmethacrylate, and 3-(2-methacryloxyethyl)-2,2-spirocyclohexyl oxazolidine.

29. The coating composition of claim 27 wherein said monomers comprise methyl methacrylate, acetoacetoxyethyl methacrylate and 3-(2-methacryloxyethyl)-2,2-spirocyclohexyl oxazolidine.

* * * * *